United States Patent [19]

Dorn

[11] Patent Number: 4,867,774
[45] Date of Patent: * Sep. 19, 1989

[54] METHOD OF PRODUCING AN ELONGATED GLASS BODY, PARTICULARLY A PREFORM FOR OPTICAL WAVEGUIDES

[75] Inventor: Reimund Dorn, Schwieberdingen, Fed. Rep. of Germany

[73] Assignee: Alcatel N.V., Amsterdam, Netherlands

[*] Notice: The portion of the term of this patent subsequent to Nov. 4, 2003 has been disclaimed.

[21] Appl. No.: 102,294

[22] Filed: Sep. 25, 1987

Related U.S. Application Data

[63] Continuation of Ser. No. 863,221, May 14, 1986, abandoned, which is a continuation-in-part of Ser. No. 703,793, Feb. 21, 1985, Pat. No. 4,620,862.

[30] Foreign Application Priority Data

May 21, 1985 [DE] Fed. Rep. of Germany ....... 3518142

[51] Int. Cl.⁴ ............................................. C03B 19/06
[52] U.S. Cl. ....................... 65/3.14; 65/3.11; 65/18.1; 65/900; 264/57; 264/60
[58] Field of Search .............. 65/18.1, 3.11, 3.14, 65/3.2, 900, 2, 18.2, DIG. 16, 144, 30.13, 30.1; 264/57, 60, 120, 1.5, 1.2, 56, 119, 314, 315, 2.2, 113, 125, 332

[56] References Cited

U.S. PATENT DOCUMENTS

| | | | |
|---|---|---|---|
| 1,599,084 | 9/1926 | Gibson | 264/60 X |
| 2,637,890 | 5/1953 | Ramsay | 264/60 |
| 2,696,652 | 12/1954 | Cronin | 65/18.1 |
| 2,960,723 | 11/1960 | Stark | 65/13 |
| 3,402,226 | 9/1968 | Carnall | 65/18.1 |
| 4,081,564 | 3/1978 | Borsuk | 426/512 |
| 4,230,473 | 10/1980 | Miller | 65/18.2 |
| 4,251,251 | 2/1981 | Blankenship | 65/18.2 |
| 4,401,615 | 8/1983 | Gerhardson | 264/120 X |
| 4,472,350 | 9/1984 | Urano | 264/113 X |
| 4,473,526 | 9/1984 | Buhler | 264/120 X |
| 4,501,601 | 2/1985 | Haupt | 65/2 |
| 4,620,862 | 11/1986 | Dorn | 65/18.1 |
| 4,661,136 | 4/1987 | Dorn | 65/18.1 |

FOREIGN PATENT DOCUMENTS

| | | | |
|---|---|---|---|
| 56-32344 | 4/1981 | Japan | 65/18.2 |
| 56-50136 | 5/1981 | Japan | 65/DIG. 16 |
| 58-208146 | 12/1983 | Japan | 65/DIG. 16 |
| 454071 | 9/1936 | United Kingdom | 65/18.1 |

OTHER PUBLICATIONS

Webster's Ninth New Collegiate Dictionary, Merriam-Webster Inc., Springfield, Mass.; p. 462; original copyright 1983.

Primary Examiner—Kenneth M. Schor
Attorney, Agent, or Firm—Peter C. Van Der Sluys

[57] ABSTRACT

A method is described of producing an elongated glass body, particularly a preform for $SiO_2$-base optical waveguides, in which starting glass powder material is shaped to a porous body and the latter is sintered to form a glass body. In order to obtain uniform density throughout the porous body, the starting glass powder material is filled into and simultaneously compacted in a mold. Subsequently, the powder material compacted during the filling is consolidated by a heat treatment to result in the porous body. Molds of different design for the production of tubular or rod-shaped porous bodies are described.

14 Claims, 2 Drawing Sheets

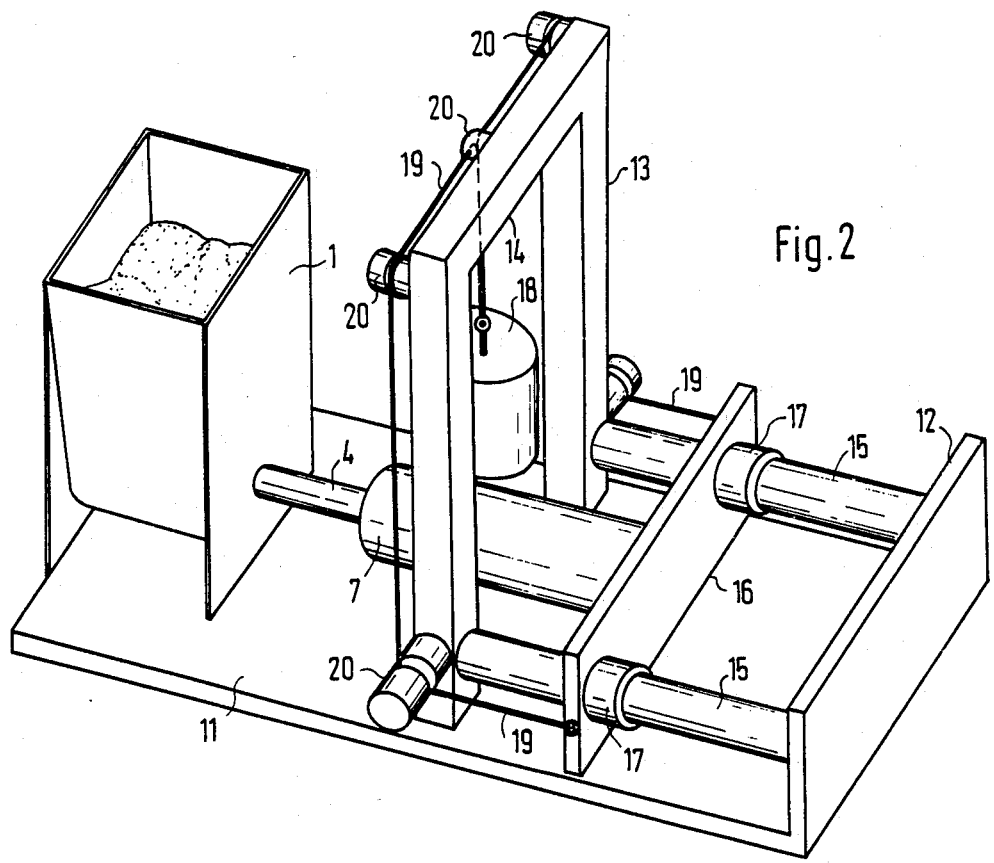
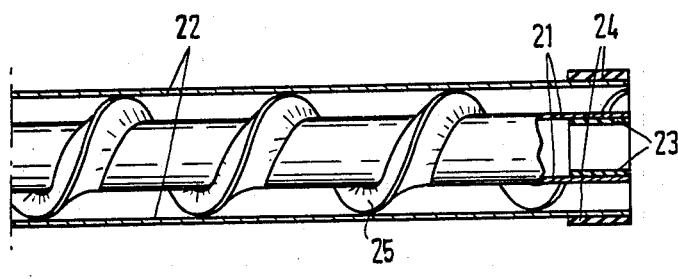

METHOD OF PRODUCING AN ELONGATED GLASS BODY, PARTICULARLY A PREFORM FOR OPTICAL WAVEGUIDES

This application is a continuation of copending application Ser. No. 863,221, filed on May 14, 1986, now abandoned, which application was a continuation-in-part of application Ser. No. 703,793, filed Feb. 21, 1985, now U.S. Pat. No. 4,620,862, issued Nov. 4, 1986.

The present invention relates to a method of producing an elongated glass body, particularly a preform for $SiO_2$-base optical waveguides, in which a porous body is formed from starting glass powder material and then sintered to form the glass body.

Such a method is known from EP-A-0 127 956. In this method, the porous body is made from the glass powder by filling it loosely into a mold, then compacting the material in a separate step, and finally subjecting the mold filled with the compacted glass powder to a heat treatment which rigidizes the powder material.

The compaction of material filled loosely into a mold has the following disadvantages:
1. It is difficult to achieve a spatially uniform density throughout the mold, since irregular spaces are formed in the loosely introduced powder by bridging. For this reason, the glass body sintered from such material will show great deviations from the desired geometry.
2. The compacting process may cause stress within the compacted material, so that the porous body will be fragile.
3. The compacting process produces a porous body which already has a relatively high density, i.e., a relatively low porosity, thus complicating the drying-/purification process.

It is therefore the object of the invention to provide a method of the kind set forth above which avoids these disadvantages.

BRIEF DESCRIPTION OF THE DRAWINGS

The invention will now be described in more detail with the help of the accompanying drawings, in which:

FIG. 2 shows an arrangement for controlling the filling pressure for the apparatus of FIG. 1; and FIG. 3 shows a part of a conveyor for forming a tubular porous body.

Figure 1:
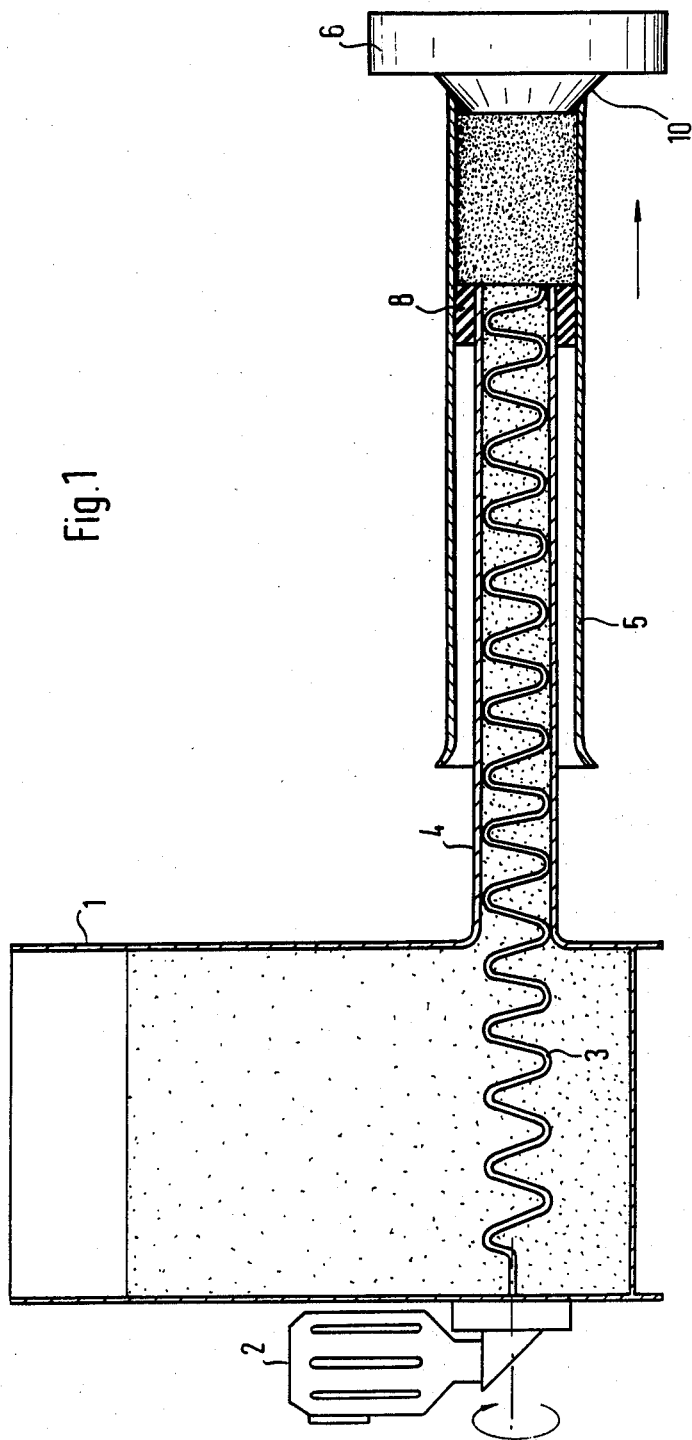
FIG. 1 shows an apparatus for filling the starting glass powder material into a mold in accordance with the method of the invention.

In the following, the invention will be described as applied to the production of a preform for optical waveguides, the starting material having $SiO_2$ as the base material, which, in order to change the refractive index, generally contains one or more dopants, such as $GeO_2$, $P_2O_5$, F, $B_2O_3$. It should be pointed out that the method according to the invention can also be used for the production of items other than optical waveguides provided that the starting material can be produced in powder form, shaped to a porous body and then sintered to form a glass body.

The apparatus of FIG. 1 has a supply vessel 1, which contains the starting glass powder material, hereinafter also simply called powder material, and which is sealed from the environment. For the application mentioned above, the powder material is a synthetically produced starting glass powder material based on $SiO_2$, with dopants if necessary. Not only the chemical vapor phase reaction process and the flame hydrolysis (also called pyrogenic process) known from the prior art reference mentioned above are suited to the production of the powder material, but also so-called "wet" chemical processes, in which the powder material is obtained by precipitation from a chemical liquid phase reaction and subsequent drying of the precipitated material.

Depending on the degree of moisture and purity of the synthetically produced powder material, it may be necessary or advantageous to carry out a drying step by annealing in a vacuum and/or a purifying step by a heat treatment in a chlorine-containing atmosphere prior to filling the material into the supply vessel. Due to the large surface area of the powder material, the effect of the drying and purifying steps is more intensive than a corresponding treatment after the shaping of the porous bodies. Such pretreatment thus allows the use of less pure and less dry materials which can be produced in a more cost-effective manner.

In order to increase the bulk density of the powder material and thus to facilitate shape-keeping compaction, it may be necessary or advantageous to agglomerate the powder material by thermal, mechanical or liquid processes.

Near the bottom of the supply vessel 1, there is a screw conveyor 3 which is driven by an outside motor 2, and by which the powder material can be conveyed out of the supply vessel 1 through a conveyor tube 4. The conveyor tube 4 projects into a mold 5, into which the powder material is to be filled. In the example shown, the mold is a silica glass tube which is closed by a cover 6 at the end located in the direction of conveyance. The filling pressure is produced by the screw conveyor pressing the material, with the conveying force predetermined by its motor, in the direction of the cover 6 and by a counterforce acting on the cover 6 against the direction of conveyance.

To limit the filling pressure, an apparatus is provided which will be explained below with the aid of FIG. 2 and which provides an adjustable counterforce.

To seal the space between the conveyor tube 4 and the mold 5, the outlet of the conveyor tube 4 is surrounded by a sealing ring 8 which is attached to the conveyor tube and provides a constant frictional force between the conveyor tube 4 and the mold 5, such frictional force not being dependent on how far the conveyor tube 4 projects into the mold at any given moment.

The end of the mold located in the direction of conveyance is sealed by the cover 6 mentioned above, which, at its side adjacent to the mold, has a truncated-cone-shaped portion 10, which is pressed into the end of the mold 5 in such a manner that its outside surface rests firmly against such end of the mold and seals the latter. The cover is attached by retaining means (not shown), e.g., a clamp, which can be mounted to the outside of the mold 5, or by a cap which can be screwed on the outside of the mold, thus surrounding the cover.

While being filled into the mold, the powder material is compacted under the filling pressure applied. The conveying force of the screw conveyor pushes the entire mold away from the conveyor tube in the direction of conveyance against the counterforce acting on the cover, until almost the entire interior space of the mold is thus filled with compacted powder material. The movement of the mold relative to the conveyor tube during the filling process is indicated below the mold by an arrow pointing in the direction of conveyance.

After filling, the mold is taken out of the filling apparatus, which is shown in its entirety in FIG. 2 and will be explained later, and placed without the cover 6 in a furnace. In the furnace, the mold filled with the compacted material is subjected to a heat treatment at almost 1200° C., during which a gas mixture is passed through the furnace.

In the process, the compacted powder material contained in the mold is dried and consolidated by the heat, and the gas mixture provides the required purification. For example, the gas mixture consists of helium, chlorine and oxygen. The chemically inert helium, which has a high diffusion rate, drives out residual gases; the chlorine combines with the impurities of the powder material, which are present in the form of hydroxyl groups and transition metals, to form highly volatile compounds; and the oxygen oxidizes carbon residues and prevents evaporation of volatile dopants. It is also possible to use mixed gases which can split off chlorine or oxygen. The residual gases still present in the porous body immediately prior to the sintering are also driven out by helium. At the end of the heat treatment, the result is a highly porous but solid body. Since the volume of the porous body shrinks slightly during the heat treatment, the body can be readily removed from the silica glass tube used as a mold.

The removal of impurities from the porous body by the gas passing through it is particularly effective if the above gas mixture is forced by suitable equipment to flow through the porous body. Suitable for this purpose is, e.g., a furnace in which the silica glass tube used as a mold can be mounted so that it forms part of the furnace's reactor tube.

The porous body, which, as a result of the process described above, has a homogeneous composition, can now be processed into an optical waveguide by, e.g., transforming it into a glass body by sintering and then drawing it to obtain a glass fiber.

In the simplest case, this fiber can be coated during the drawing process with a transparent plastic cladding whose refractive index is lower than that of the glass material, so that an optical waveguide is produced in the form of a plastic-clad silica (PCS) fiber. However, the porous body can also be processed into another type of optical waveguide in a different manner which will be explained later.

With the help of FIG. 2, the entire constructional arrangement of a filling apparatus will now be explained, whose essential details for the method according to the invention are shown in FIG. 1, in particular the apparatus which exerts the counterforce against the conveying force of the screw conveyor during filling. The following parts are fixed to the base plate 11: the storage vessel 1 for the powder material with the conveyor tube 4 projecting therefrom; a bracket plate 12 which forms a right angle with the base plate, the bracket plate and the storage vessel being disposed at opposite ends of the base plate 11; a bridge-like support frame 13, which is attached to the base plate so that its cross beam 14 is at right angles to the longitudinal axis of the base plate and parallel to the bracket plate. Between the vertical beams of the support frame and the bracket plate 12 extend two parallel guide elements, e.g., guide tubes 15, on which a back-pressure platen 16, which is provided with guide sleeves 17, is movable in the longitudinal direction of the base plate between the support frame and the bracket plate.

Like the back-pressure platen 16, the tube 7, which contains the mold and into which projects the conveyor tube 4, is movable in the longitudinal direction, either by being rigidly but detachably connected to the back-pressure platen 16 or slidable in a guide groove, while its end, closed by a cover, rests against the back-pressure platen, without being attached to the latter. An adjustable weight 18, which is suspended from the support frame 13 via pulling ropes 19 and guide rolls 20, causes the back-pressure platen to press from the outside against that end of the tube 7 against which the powder material in the tube is forced by the action of the screw conveyor. The pulling ropes 19 are attached to both sides of the back-pressure platen 16.

During the filling, the mold is thus pushed away from the conveyor tube in the direction of conveyance by the action of the screw conveyor, while the powder material filled into the mold is compacted. The pressure at which compaction occurs is determined by the weight 18, which presses the back-pressure platen, and thus the end of the conveyor tube, against the force of the screw conveyor. The speed at which the powder material is filled into the mold is determined by the design and the rotational speed of the screw conveyor, and the filling pressure can be adjusted by the weight 18.

It goes without saying that a great number of other apparatus is suitable for filling the powder into the mold at an adjustable filling pressure. This can be an apparatus which operates in a kinematically inverted manner, in which the tube 7 is fixed and the supply vessel with the conveyor tube 4 is movable opposite the direction of conveyance against an adjustable weight counteracting the conveying force.

Basically, the filling process illustrated by FIG. 1 can also be implemented in cases in which the porous body to be formed is not homogeneous, but has a composition which changes in the radial direction. This is possible if in addition to the screw conveyor 3 shown, which conveys powder material in the area of the longitudinal axis of the mold into the latter, there are one or more additional screw conveyors which are coaxial with the inner screw conveyor 3 and which fill materials with other compositions into coaxial areas which are adjacent to the inner area. These screw conveyors are then located in the spaces between several coaxial screw conveyors. The conveying speed and the filling pressure can be adjusted individually for each of the screw conveyors, and the maximum filling pressure exerted in the respective area is determined by the counterforce acting on the closed end of the tube, as described above. By the independent control of the respective filling pressure exerted by the various screw conveyors, specific axial changes in the diameter ratios of the individual adjoining areas can be adjusted. If such an arrangement of coaxial screw conveyors is used, the method in accordance with the invention for the production of different optical waveguide types permits the forming of porous bodies which are to consist of core glass material, if necessary having a radially changing composition and surrounding cladding glass material in any desired gradation.

Other porous bodies, not exclusively having a rotation-symmetrical structure such as those previously described, can also be produced if adjacent screw conveyors, each surrounded by conveyor tubes, are used which are arranged, e.g., in a triangular or a square configuration. It is thus possible to produce optical waveguides with multiple cores in which independent light signals can propagate side by side in parallel, or which have polarization-maintaining properties. If such an arrangement of cores is to be surrounded by one or more cladding materials, this can be achieved by one or more additional screw conveyors which is/are arranged around this arrangement of cores and which fill(s) one or more materials into areas which are coaxial with the longitudinal axis of the arrangement of cores. Again, the filling pressure and the conveying speed can be controlled individually for each of the screw conveyors.

In the description so far, irrespective of the arrangement of the screw conveyors, the mold was shaped invariably as a hollow cylinder, so that the subsequent heat treatment always resulted in a rod-shaped porous body. However, the mold can also be designed so that the shaped porous body is a tubular body. In this case, a screw conveyor is used which, unlike the screw conveyor shown in FIG. 1, does not convey the material in the area of its axis, but in an area having an annular cross section which area is coaxial with its rotation axis. Such a screw conveyor is shown in FIG. 3.

This screw conveyor 25 rotates in the space between an inside tube 21 and a coaxially arranged outside tube 22 around the inside tube, so that it conveys the starting glass powder material through this space into the mold and in a coaxial area spaced some distance apart from the axis.

As a mold to form a tubular body, the mold of FIG. 1 can be used with a slight variation. In this variation, a rod or a tube of, e.g., silica glass is arranged along the longitudinal axis of the mold from one end to the other, such rod or tube being attachable, e.g., to the cover 6 in a central recess. In an analogous manner, the screw conveyor of FIG. 3 now conveys the powder material into the space between this rod or tube and the inside wall of the mold, as described above with the aid of FIG. 1. After the heat treatment, the rod or tube can be removed easily from the center of the porous body.

At the front end, the arrangement of FIG. 3 has two sealing rings 23 and 24 which seal the area in which the powder material is conveyed into the mold against the adjacent parts of the mold and which provide a constant frictional force independent of the position, as provided by the sealing ring 8 in the arrangement of FIG. 1. The inner sealing ring 23 is attached to the inside of the inner tube 21 and rests against the outside of the rod or tube, while the outer sealing ring 24 is attached to the outside of the outer tube 22 and rests against the inside of the mold 5 (FIG. 1).

There are several possibilities of producing a rod-shaped, elongated glass body which constitutes a suitable preform for an optical waveguide from the tubular porous body.

The tubular porous body can be sintered in such a way that it collapses to a rod-shaped glass body during the sintering. Another possibility is to insert a rod-shaped porous body produced as described above into the tubular porous body and to sinter the porous rod-in-tube structure to form the rod-shaped glass body. If the tubular body is made of optical waveguide cladding material and the rod-shaped body of core material, the vitreous preform produced in this manner can be made into an optical waveguide consisting of a core and a cladding.

Yet another possibility of forming an elongated glass body from a rod-shaped porous body is to sinter the tubular porous body to form a glass tube and the rod-shaped porous body to form a glass rod, to insert the glass rod into the glass tube and to fuse the resulting structure to obtain an elongated glass body.

In the following, some variations of the method described above will be explained:

In the method described above, the composition of the shaped tubular and/or rod-shaped bodies is already determined by the composition of the starting glass powder material, i.e., by the dopants contained in the $SiO_2$ base material, such as $GeO_2$, $P_2O_5$, F, $B_2O_3$.

Instead, the porous body can also be produced from pure $SiO_2$ base material with the addition of dopants to the porous body by diffusion. Such diffusion is effected in a separate process step following the heat treatment described above and the purification of the compacted powder material in the mold.

For example, it is possible to dope a tubular porous body with fluorine by a heat treatment in a suitable fluorine-containing gaseous atmosphere, which contains, e.g., $CF_4$, and thus to reduce the refractive index of the glass produced from this body, as compared to undoped $SiO_2$ glass. Together with an undoped or differently doped rod-shaped porous body, a tubular porous body doped in the manner described above can be processed as described above to result in a vitreous preform for an optical waveguide consisting of a core and a cladding.

A tubular porous body can also be processed in the following manner, irrespective of whether and how it was doped.

The tubular porous body can be used as a mold for the process described above for filling and compacting the powder material as described above, with a subsequent heat treatment.

Instead of a silica glass tube, a porous tube of doped or undoped $SiO_2$ starting glass material is filled with a powder material of the same or a different chemical composition as described above. The tube with the compacted powder material contained therein is then subjected to a heat treatment so that a rod-shaped porous body is formed inside the tube.

This structure is subsequently sintered from two porous bodies to form a glass body.

If the structure consisting of two porous bodies is not yet doped as desired, e.g., if it contains no dopants at all, the porous tube, together with the rod-shaped porous body contained therein, can be doped at this stage as described above for a porous tube, by diffusing the dopant, e.g., fluorine, by a heat treatment in a suitable environment, into the rod-in-tube structure. The dopant concentration which can thus be obtained depends on the density of the porous material, so that by different densities of the tubular body and the rod-shaped porous body contained therein, a different dopant concentration in the two bodies can be obtained, although only a single diffusion step is carried out. The glass body obtained after the sintering is thus a suitable preform for an optical waveguide which consists of a core and a cladding.

This kind of doping by diffusion of the dopant can also be used for such porous rod-in-tube structures whose rod-shaped porous body was produced in another manner without the use of the porous tube as a mold, and also for rod-shaped porous bodies having a constant density or a density changing in the radial direction.

In the embodiment described above, a silica glass tube is used as a mold and removed from the porous body after the heat treatment, i.e., before the sintering. However, the porous body can also remain in the silica glass tube after the heat treatment and during the sintering. After the sintering, the glass body, which has shrunk noticeably, can be removed from the silica glass tube. In this process, the temperature during the heat treatment does not have to be so high as to make the porous body shrink.

Yet another method in which shrinkage of the porous body during the heat treatment is not required is the following: A tube, preferably made of silica glass, consisting of two half shells or of several parts, is used. If such a tube is taken apart, the porous body can be readily removed.

If a tube consisting of several parts is used, it can be removed from the porous body after the filling and compaction even before the heat treatment, since the powder material is made cohesive enough by compaction that it can no longer disintegrate even prior to consolidation during the heat treatment.

A further aspect of the method described above which does not concern its process characteristics but represents only a measure which is to facilitate the manipulation of the porous body, is the following:

Into the powder material filled into and compacted in the mold, a silica glass rod is inserted during the filling, which remains in the material during the subsequent process steps. During the filling, this silica glass rod is secured in an opening in the center of the cover 6 so that it extends a short length into the mold 5, running along the longitudinal axis thereof. The opening is fitted with a sealing ring which is so firmly attached to the silica glass rod that the latter resists the filling pressure during the filling and maintains its position and that, after the filling, the cover is pushed beyond the free end of the silica glass rod and can thus be removed. During the subsequent process steps, i.e., the heat treatment and the sintering, and during the subsequent drawing of the optical waveguide from the vitreous preform, the silica glass rod remains in the porous body and in the vitreous preform being produced therefrom.

It should be mentioned that care must be taken in each phase of the method described, from the production stage of the starting glass powder material to the sintering step to form an elongated glass body suitable as a preform, to avoid contamination of the material.

In this respect, it is advisable that the supply vessels for the powder material always be sealed air-tight and that filling into the mold be effected in an enclosed environment, e.g., in an evacuated glove box. The conveyor tube(s) project(s) into this glove box from the outside through a vacuum-tight duct. Only after the mold has been closed by covers at both ends is it removed from the glove box and transferred to the furnace for the heat treatment. For cleanliness, it is advisable that, if possible, the powder material come into contact only with apparatus parts made of silica glass, i.e., not only the mold, but also the filling apparatus should be made of silica glass.

A further step to prevent contamination is to conduct the heat treatment of the porous body in a gaseous atmosphere and the subsequent sintering to form a glass body in a single apparatus which keeps the porous body in an enclosed environment between the heat treatment and the sintering step, e.g., by pushing the porous body upwards from below through a first zone in which the heat treatment is conducted, and then immediately into a second zone in which the sintering is carried out.

A variation of the method is described in the following, in which use is made of the principle according to the invention that the starting glass powder material is compacted during the filling into the mold but that no screw conveyors are used for the process. In this variation, the mold, which is the same as or similar to the molds described above, is set in a rotational motion during the filling so that the centrifugal force acts in the direction of the mold's longitudinal axis and that the powder material is filled into and compacted in the mold under the action of said centrifugal force, which also determines the filling pressure. This method also allows the use of several coaxial tubes in order to produce a porous body having a radially changing composition, or a tubular porous body.

For the production of rod-shaped porous bodies whose composition changes in the radial direction, such methods were described above, among others, in which powder material having a composition changing in the radial direction is filled into and compacted in the mold out of several coaxially arranged conveyor tubes. The filling pressure causing the compaction is produced either by screw conveyors or by a centrifugal force. In any event, the coaxial arrangement of different conveyor tubes and the simultaneous conveyance of different materials involves a great deal of equipment.

In the following, a method requiring less complex equipment is explained: As described above in connection with the production of a tubular body, an elongated body, i.e., a rod or a tube, made of, e.g., silica glass, is located in the mold of FIG. 1 along the longitudinal axis in the center from one end to the other. Glass-forming powder is filled into the space between this body and the inside wall of the mold by a screw conveyor in such a manner that the powder material is compacted in the process. The material filled into the mold has a composition which is suitable for, e.g., the cladding of an optical waveguide. Due to the compaction, the material filled into the mold has a consistency such that the body can be removed after completion of the filling step without the material falling into the space being formed. After the body has been removed, a further starting glass powder material having a different composition, e.g., consisting of core material, is filled into the space and compacted therein.

If this material is to have a composition which is constant across the cross section, it is filled into the mold in the manner shown in FIG. 1 by a centrally located screw conveyor. If the composition of the material is to vary across the cross section, as is required for an optical waveguide having a graded-index profile, a different body having a smaller diameter is arranged in the center of the space along the longitudinal axis after removal of the body, and starting glass powder material having a different composition is filled into and compacted in the mold using the screw conveyor of FIG. 3 adapted to the space. The body is then removed and the next body inserted, etc., until the remaining space is filled by a centrally arranged screw conveyor with the material suitable for the inner area. The first filling process is thus repeated several times with different compositions of material, a different body and a screw conveyor adapted thereto, respectively, until the remaining space is filled.

The method described above in which the adjacent coaxial areas of the mold are filled in succession has the advantage that each of the different filling steps can be controlled individually, independent of the others, with regard to the filling pressure and the filling speed.

Instead of the screw conveyors, correspondingly acting centrifugal forces can be used in this method.

In the method just described, too, it is possible to dope the porous body, obtained by the consolidating heat treatment of the material filled in, by diffusing the dopant, e.g., F, by a heat treatment in a suitable atmosphere. The different densities of adjacent layers of the porous body give a different dopant concentration in this kind of doping by diffusion.

Doping by diffusion can also be used in the following process:

A vitreous or porous, doped or undoped rod of core glass material is inserted into the mold and held during the filling process in such a way as to extend along the longitudinal axis of the mold at the center thereof from one end to the other. As described above, the powder material is then filled into the space between the rod and the mold and is then consolidated in a heat treatment. Following this heat treatment, the consolidated structure is doped in another heat treatment by diffusion in an atmosphere contaiing fluorine or a fluorine-containing compound as a dopant. If a vitreous rod is used, only the adjacent porous, consolidated material will be doped; if a porous rod is used, it will be imparted a doping concentration different from that of the adjacent, likewise porous and consolidated material, because its density differs from that of the adjacent material.

In this doping heat treatment, the partly or entirely porous consolidated body can either remain in the mold or be previously removed therefrom.

As an alternative to the heat and doping treatment described above, doping by diffusion can also be effected already during the consolidating heat treatment.

Finally, in the method just described, in which powder material is filled into a mold containing a rod of core glass material and then consolidated, it is also possible to dispense with the doping treatment by diffusion if the core glass material and/or the powder material is/are composed in such a way that they contain the dopants in a suitable concentration.

In any event, the partly or entirely porous consolidated body, whether doped through the composition of the rod and the powder material filled in or as a result of a diffusion doping process effected after consolidation, is sintered to a vitreous body, during which step it can either remain in the mold or be previously removed therefrom, as described above in the other embodiments.

I claim:

1. A method of producing an elongated glass body for use as a preform for SiO$_2$-base optical waveguides wherein a porous body is initially formed from a glass powder material and then sintered to form the glass body, said method comprising the steps of:
    providing a supply vessel for glass powder material, said supply vessel including a tube extending therefrom, and a conveying means for conveying glass powder material from said vessel through said tube;
    inserting said tube from said supply vessel into a first end of a rigid, hollow elongated mold, said tube having an open portion from which glass powder material is discharged into said mold and said tube and mold exhibiting selective relative motion along the lengths thereof, thereby enabling said mold to be displaced with respect to said tube as said mold receives glass powder material;
    covering a second end of said mold with cover means for covering said second end of said mold;
    applying a longitudinal force against the cover means so that the force acts upon the cover means and mold in a direction towards the first end;
    conveying glass powder material from said supply vessel through said tube, said conveying means subjecting said glass powder material to a continuous filling pressure as said glass powder material is conveyed through said tube;
    discharging glass powder material from said open portion of said tube into said mold thereby displacing said mold in a direction opposite to that of said longitudinal force applied to said cover means with respect to said tube as filling pressure on said glass powder material at said open portion of said tube acts against the longitudinal force applied to said cover means, whereby the glass powder material is compacted as it is discharged from the tube;
    consolidating said compacted glass powder material within said mold by heat treating to form a porous body; and
    sintering the porous body to form the glass body.

2. The method according to claim 1 wherein said mold is formed of silica glass.

3. The method according to claim 1 wherein said mold takes the form of a porous tube of glass material having a composition differing from said glass powder material, said method additionally comprising the step of simultaneously sintering said porous tube of glass material to form said glass body after said porous body has been formed therein by heat treating compacted glass powder material therein.

4. The method according to claim 1 wherein said mold takes the form of a tube having a plurality of parts, said method additionally comprising the steps of disassembling said tube and removing the porous body therefrom.

5. The method according to claim 1 wherein the step of sintering said porous body is performed within said mold and additionally comprising the step of removing the glass body formed from said mold.

6. The method according to claim 1 additionally comprising the step of inserting a portion of a silica glass rod into said glass powder material during said step of conveying and retaining said portion of said silica glass rod as a manipulating aid during subsequent method steps.

7. The method according to claim 1 wherein said step of conveying is accomplished by a screw conveyor under continuous controllable pressure and speed.

8. The method according to claim 1 wherein said step of conveying is achieved by means of an arrangement of coaxial screw conveyors whereby glass powder material having a first composition is conveyed into said mold in one area near an axis thereof and at least one material having a different composition is conveyed into said mold in at least another area coaxial with said one area, said step of conveying being conducted under continuous controllable pressure and speed.

9. The method according to claim 1 wherein glass powder materials having differing composition are conveyed successively in time into adjacent coaxial areas of said mold by separate screw conveyors under continuous controllable pressure and speed.

10. The method according to claim 1, wherein said filling pressure is produced by force generated by a screw conveyor and is limited to a maximum level determined by said longitudinal force.

11. The method according to claim 1 wherein said glass powder material is subjected to treatment prior to placement in said supply vessel said treatment taking the form of at least one of drying by vacuum annealing and purification by heat treating in a chlorine-containing atmosphere.

12. The method according to claim 1 additionally comprising the step of agglomerating said glass powder material in order to increase bulk density prior to the step of conveying.

13. The method according to claim 1 wherein said porous body formed in said mold is doped by a heat treatment wherein a dopant is diffused into said porous body.

14. The method according to claim 1 wherein a rod-shaped body is positioned in the center of said mold to extend from one end of said mold to the other prior to said step of conveying, whereby said glass powder material is conveyed to fill said mold with compacted glass powder surrounding said rod-shaped body.

* * * * *